A. CAMPBELL.
DUMP CAR.
APPLICATION FILED APR. 20, 1908.

913,358.

Patented Feb. 23, 1909.
6 SHEETS—SHEET 1.

WITNESSES:
F. B. Townsend
H. W. Munday

INVENTOR
Argyle Campbell
BY
Munday, Evarts, Adcock & Clarke
his ATTORNEYS

A. CAMPBELL.
DUMP CAR.
APPLICATION FILED APR. 20, 1908.

913,358.

Patented Feb. 23, 1909.
6 SHEETS—SHEET 3.

WITNESSES:
F. B. Townsend
H. W. Munday

INVENTOR
Argyle Campbell
BY
Munday, Evarts, Adcock & Clarke.
his ATTORNEYS

A. CAMPBELL.
DUMP CAR.
APPLICATION FILED APR. 20, 1908.

913,358.

Patented Feb. 23, 1909.
6 SHEETS—SHEET 5.

WITNESSES:
F. B. Townsend
H. W. Munday

INVENTOR
Argyle Campbell
BY
Munday, Evarts, Adcock & Clarke.
his ATTORNEYS

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP-CAR.

No. 913,358.    Specification of Letters Patent.    Patented Feb. 23, 1909.

Application filed April 20, 1908. Serial No. 427,982.

*To all whom it may concern:*

Be it known that I, ARGYLE CAMPBELL, a citizen of the United States, residing in Chicago, in the county of Cook and State of Illinois, have invented a new and useful Improvement in Dump-Cars, of which the following is a specification.

My invention relates to improvements in dump cars, and more particularly to the operating mechanism for dump car doors.

The object of my invention is to provide a dump car door operating mechanism of a strong, efficient and durable construction, composed of few parts and capable of being easily operated, and by which the doors will be held or locked securely in their closed position, and in which the load on the doors will have no tendency to unlock or release the door operating mechanism, while at the time the door operating mechanism is or may be located above the doors and generally between the center sills.

My invention consists in the combination with a dump car door or doors, of an operating mechanism therefor, comprising an operating shaft above the doors and preferably between the center sills of the car, a winding drum on said shaft having an upper shouldered locking face, the drum being preferably four sided, a locking block having a shouldered under face adapted to engage and interlock with the shouldered upper face of the drum, a plurality of connecting links between the locking block and the drum, the same being preferably three in number, and fitting and corresponding to three sides of the drum while the locking block fits and corresponds to the remaining side thereof, and supporting bars or connections between the doors and the locking block, the supporting bars or connections having a pivotal connection with the locking block directly over or in line with the operating shaft so that the load on the doors will not tend to turn the operating shaft or to release the operating mechanism, the supporting bars or connections and operating shafts being so constructed and combined or arranged, that the supporting bars or connections will clear the operating shafts when the door or doors are raised and in their closed position.

The invention further consists in a pair of transversely hinged doors on opposite sides of the car center sills with a connection bridge or bar between them, so that they may be operated as one, with a longitudinally extending operating shaft between the center sills, and provided with my winding drum, locking block, connecting links between the locking block and drum, and supporting bars or connections between the locking block and the bridge bar which connects the doors.

It further consists in connection with these parts, of a supporting bar or connection between the locking block and the door, provided with a bend therein to clear the operating shaft.

It further consists of a novel construction of parts and devices and in the novel combinations of parts and devices herein shown and described and more particularly specified in the claims.

In the accompanying drawing forming a part of this specification, Figs. 7 to 14 illustrate a number of different slightly modified constructions of my invention, suitable for use in applying the same to different cars and to different arrangements of dump car doors.

In the drawing, 1 represents a dump car of any suitable kind or construction.

2 are the center sills, 3 the car floor, the same preferably having a hopper shape at the portion 4 thereof adjacent to the doors 5. The doors 5 are hinged at 6 to hinge brackets or members 7, secured to or forming part of the car frame. Two doors 5 on opposite sides of the center sills are preferably connected together by a bridge bar 8 extending across and below the center sills so that the two doors thus connected may be operated as one. The doors are preferably arranged in pairs on opposite sides of the center sills, and are preferably hinged to swing open on axes or pivots which are transverse to the center sills so that the doors are transversely opening ones. And two sets of doors, each set comprising a pair are preferably arranged with their free or swinging edges adjacent so that both sets may be simultaneously opened or closed by the same operating shaft and drum, as will be readily understood from Fig. 4.

The operating shaft 9 of the dump car door operating mechanism is preferably longitudinally arranged between the center sills, and is journaled in suitable bearings 10 secured to the center sills. The operating shaft 9 is provided with a drum 12, preferably four sided, and having an upper locking face or side 13 furnished with a shoulder or projection 14, the locking upper face 13 of the drum 12 being preferably slightly inclined toward the shoulder 14. The drum 12 is further provided with pivot lugs 15, and also with guides or flanges 16 on the side thereof opposite the pivot lugs 15.

17 is a locking block or link having on its under face 18 a shoulder 19 adapted to interlock with and engage the shoulder 14 on the upper or locking face 13 of the drum 12. The locking block 17 is flexibly connected to the drum 12 or its pivot lugs 15, by connecting links 20, preferably three in number and fitting and corresponding to three sides of the drum 9, while the locking block 17 fits and corresponds to the remaining side thereof. The terminal link 20 is hinged or pivotally connected to the pivot lugs 15 by a pivot pin 21, and similar pivot pins 21 connect the several links with each other and to the locking block 17. The under face 18 of the locking block is preferably slightly inclined to correspond to the inclined upper locking face 13 of the drum 12.

Figure 4:
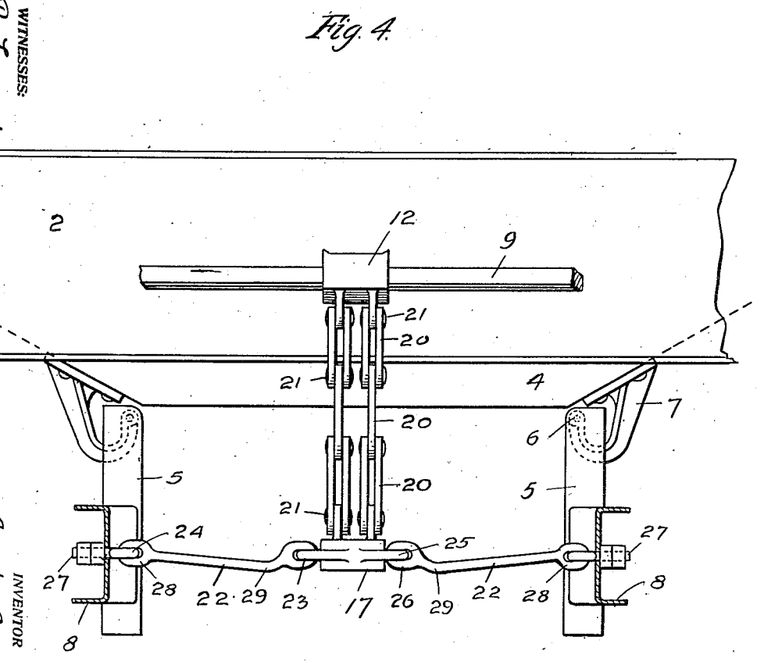
Fig. 4 is a detail elevation partly in vertical longitudinal section showing the doors open.
Figure 5:
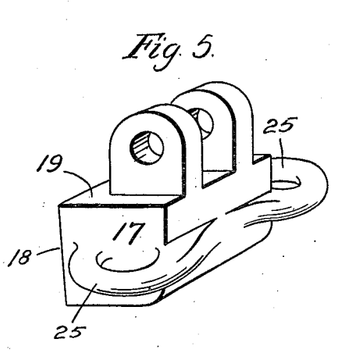
Fig. 5 is a detail perspective view of the locking block.
Figure 6:
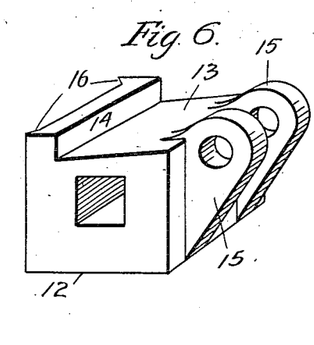
Fig. 6 is a detail perspective view of the winding drum.

The locking block 17 is flexibly connected with the door or doors 5 or the bridge bar 8 between two doors 5, when two doors are thus connected to be operated as one, by means of a pivotal supporting bar or connection 22, which has a loose or pivotal connection 23 at its upper end with the locking block 17, and a loose or pivotal connection 24 at its lower end with the door 5 or the connecting bridge 8 between two doors. The pivotal connection 23 between the supporting bar 22 and the locking block 17 may be of any suitable kind or construction. As illustrated in Figs. 1 to 5, it consists of a connecting lug or eye 25 on the locking block 17 which fits in a corresponding pivot eye or opening 26 in the upper end of the supporting bar 22. The pivotal connection between the supporting bar 22 and the door 5 or its bridge bar 8 may likewise be of any suitable kind or construction. As illustrated in Figs. 1 to 5, it consists of an eye bolt 27, attached to the door or its bridge bar, which fits in a corresponding eye 28 at the lower end of the supporting bar 22. The pivotal connection 23 between the supporting bar 22 and the locking block or member 17 is arranged directly over or in line with the center of the operating shaft 9 so that the load on the doors will exert no turning tendency on the operating shaft. The supporting bar or connection 22 between the door and locking block is arranged to clear the operating shaft when the doors are in their closed or locked position. This is preferably done by providing the pivotal supporting bar or connection 22 with a bend 29 therein.

Where the doors are arranged to be operated in sets or pairs, as shown in the drawing, two supporting bars 22 are connected to the same locking block 17, one at each end thereof, as will be readily understood from Figs. 4 and 5, so that two sets of doors may be operated simultaneously from the same drum.

The operating shaft 9 when arranged longitudinally between the center sills, as illustrated in Figs. 1 to 4, is actuated through a connecting shaft 30 extending transversely to the side of the car and connected with the operating shaft 9 by bevel gears 32, 33, or other suitable gearing. The connecting shaft 30 is furnished with a ratchet 31 and pawl 34 and pawl lever 35, or other suitable means for actuating the operating shaft 9.

Figure 1:
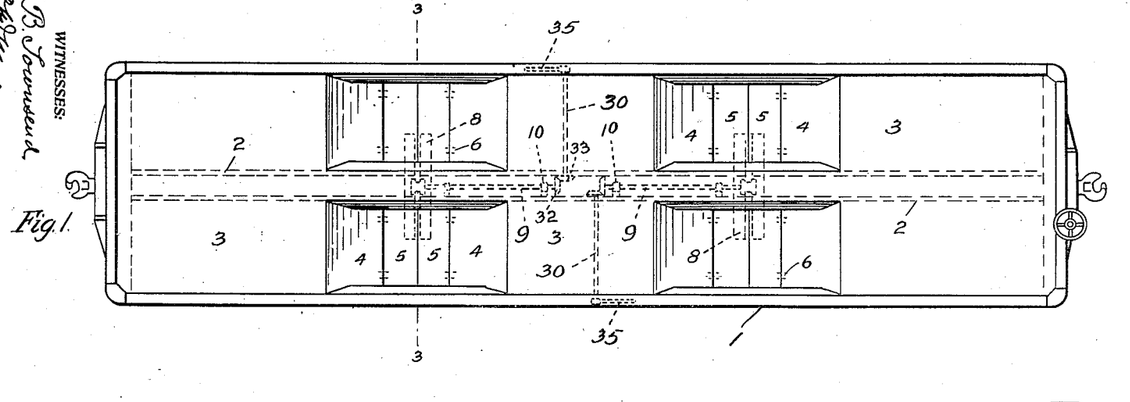
Figure 1 is a diagrammatic plan view of a dump car embodying my invention.
Figure 2:
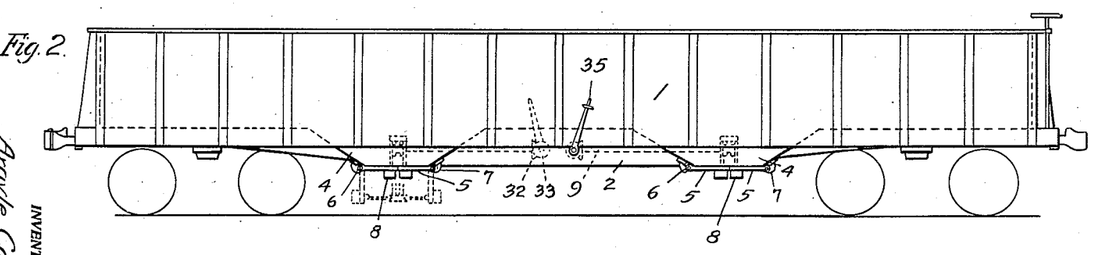
Fig. 2 is a diagrammatic side elevation of same.
Figure 3:
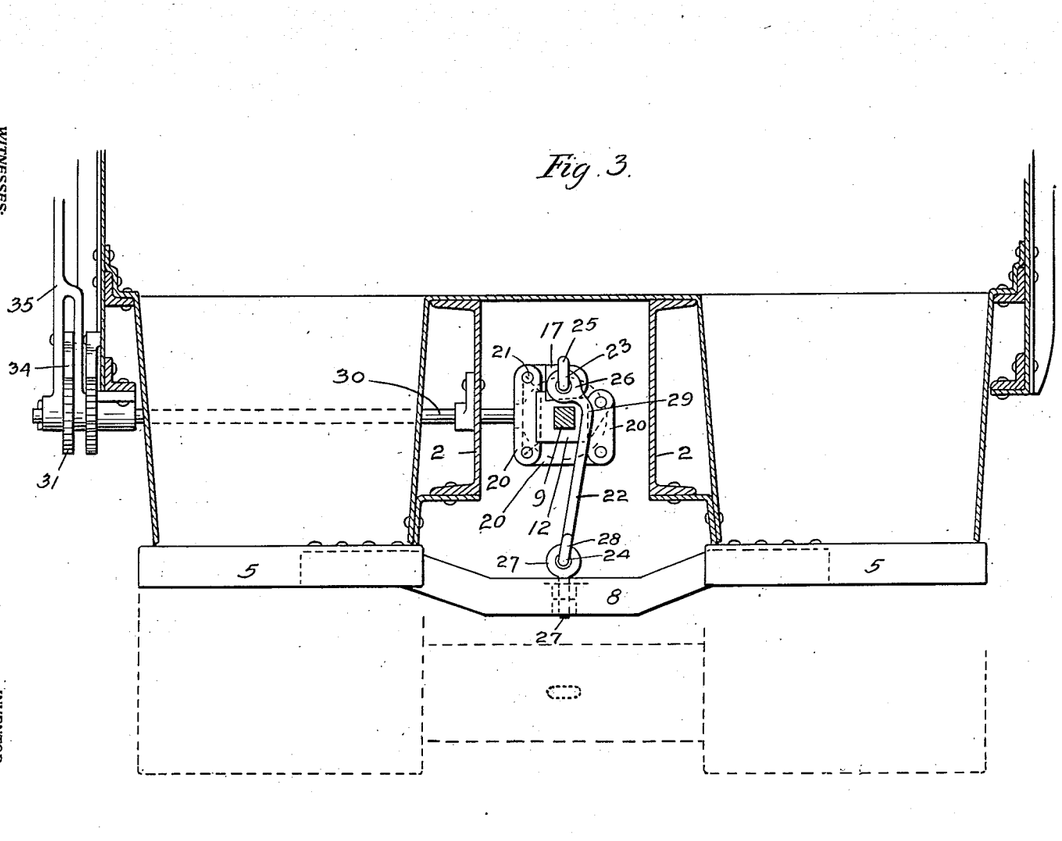
Fig. 3 is a vertical cross section on line 3—3 of Fig. 1.
Figure 7:
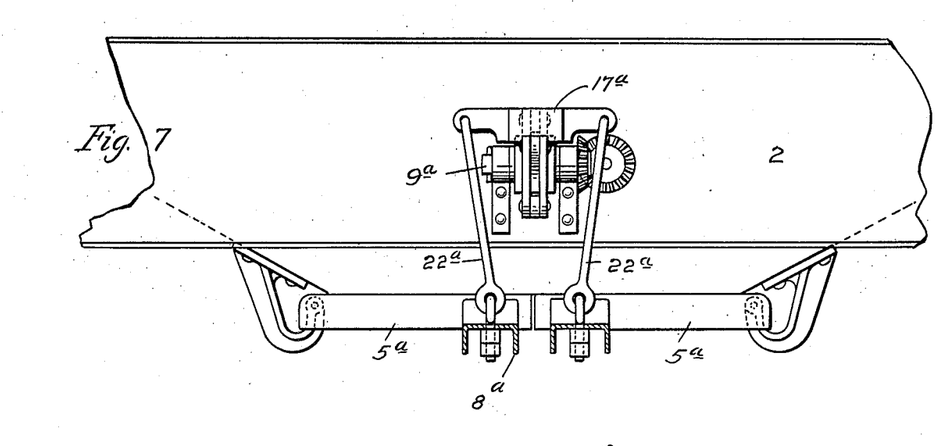
Fig. 7 is a detail elevation, partly in vertical section, illustrating a modification in which a short operating shaft is employed so that the pivoted supporting bars or connections between the locking block and the doors may clear the operating shaft at its ends.
Figure 8:
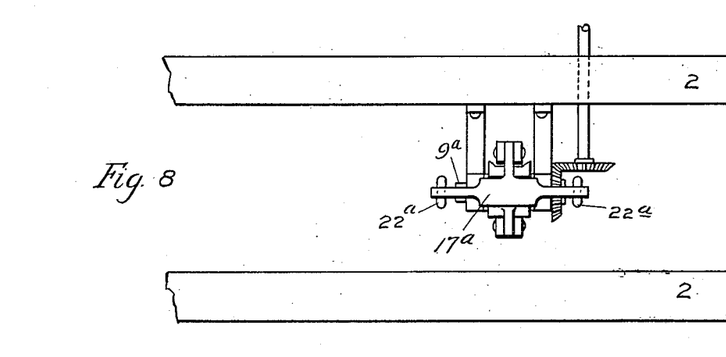
Fig. 8 is a detail plan view of the construction shown in Fig. 7.

In the modification illustrated in Figs. 7 and 8, the operating shaft $9^a$ is made short and the supporting bars $22^a$ between the locking block $17^a$ and the doors $5^a$ are arranged to clear the operating shaft at the ends thereof so that these supporting bars or connections $22^a$ do not require to be provided with any bend therein, as shown in Fig. 3.

Figure 9:
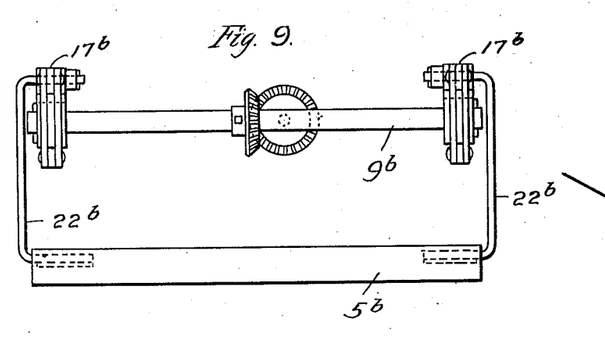
Figs 9 and 10 illustrate a further modification in which each door is furnished with two pivotal supporting bars or connections between it and the locking blocks, one at each end of the door.
Figure 10:
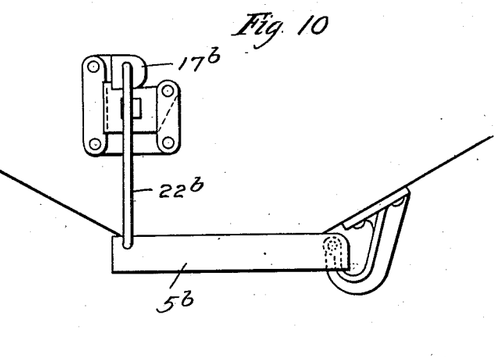

In the modification illustrated in Figs. 9 and 10, the pivotal supporting bars $22^b$, which connect the locking blocks $17^b$ with the doors 5ᵇ are arranged one at each end of the door and are aranged to clear the operating shaft 9ᵇ at the ends thereof.

Figure 11:
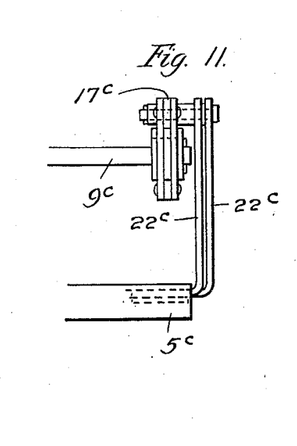
Figs. 11 and 12 show a further modification similar to that shown in Figs. 9 and 10, excepting that a pair of doors is employed instead of a single door.
Figure 12:
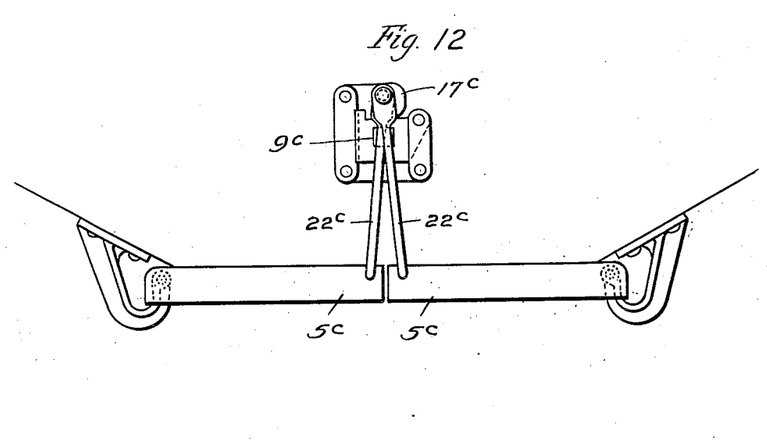

In the modification illustrated in Figs. 11 and 12, the construction is the same as shown in Figs. 9 and 10, excepting that the locking block 17ᶜ is connected by supporting bars or connections 22ᶜ, 22ᶜ with the meeting or swinging edges of two doors 5ᶜ 5ᶜ, thus operating two oppositely swinging doors from one and the same winding drum, the supporting links 22ᶜ clearing the operating shaft 9ᶜ at the ends, the same as in the construction shown in Figs. 9 and 10.

Figure 13:
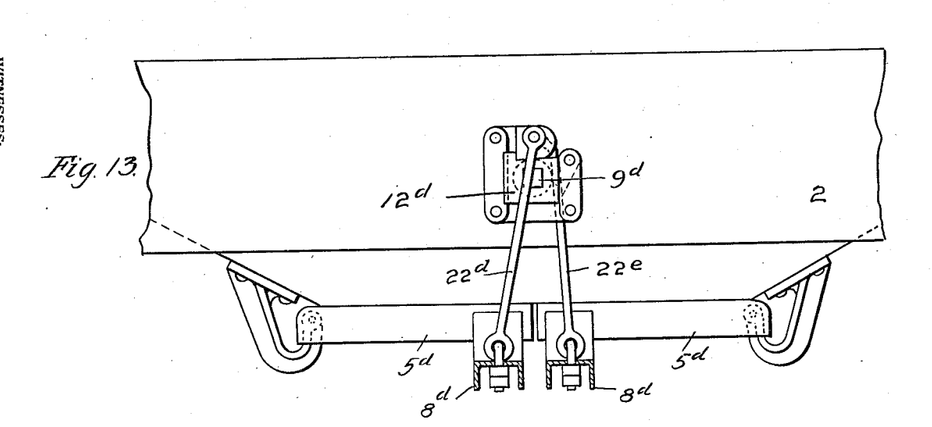
Figs. 13 and 14 illustrate a further modification in which one of the pivotal supporting bars or connections between the locking block and door clears the operating shaft at the end, while the other clears it by having a bend therein, and in which the operating shaft is arranged parallel to the hinges of the doors.
Figure 14:
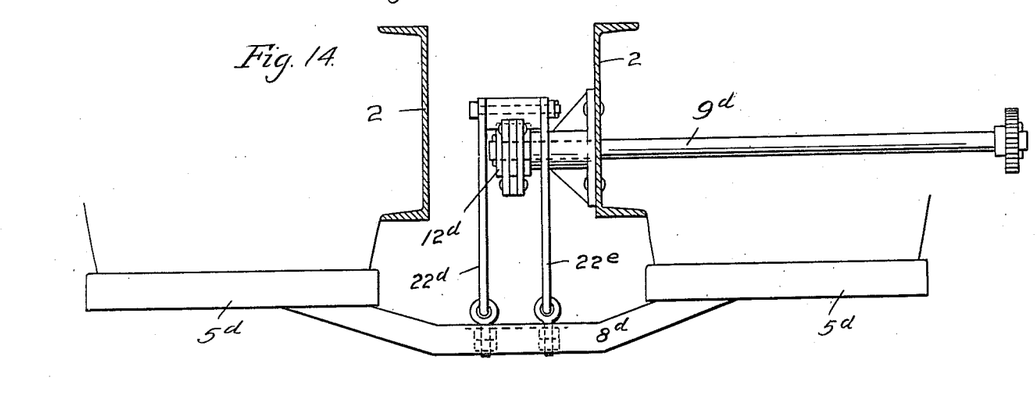

In the modification illustrated in Figs. 13 and 14, the operating shaft 9ᵈ is arranged transversely to the center sills instead of parallel thereto, and the winding drum 12 is arranged on the inner end of the operating shaft, and one of the supporting links or bars 22ᵈ is arranged to clear the operating shaft at the end, while the other supporting bar 22ᵉ is furnished with a bend to enable it to clear the operating shaft 9ᵈ. And in the construction shown in Figs. 13 and 14, two doors 5ᵈ are connected by a bridge or connecting bar 8ᵈ so that two doors may be operated simultaneously by each of the links 22ᵈ and 22ᵉ.

It will, of course, be understood by those skilled in the art that the several different modifications illustrated in Figs. 7 to 14 are only intended to illustrate a few of the different modified embodiments of my invention, and I wish it to be expressly understood that the modifications so shown shall not be in any way considered as tending to limit the scope of my claims, because my invention may be embodied in various other constructions than those illustrated in any of the figures in the drawing.

The locking block or member 17 to which the door supporting connection 22 is pivotally secured, in my invention, it will be seen, forms the fourth or terminal member of the link connection which winds around the drum in raising and lowering the doors. And it is this terminal link member 17, which rests directly upon the flat upper side or face of the drum, through which the load upon the doors is directly transmitted to the drum 12 and operating shaft 9.

While the center of the pivotal connection between the supporting bar or link 22 and the locking block 17 should be directly over the axis or center of the operating shaft 9, the lower bearing face of the locking block 17 against the upper flat bearing face of the drum 12 preferably has its major portion on the shoulder side of the drum. This in connection with the slight inclination of the contacting faces of the drum and locking block towards the shoulder of the locking block aids in holding the parts securely in their locked position.

I claim:—

1. In a dump car, the combination with a load supporting door, of an operating shaft above the door, a polygonal winding drum on said shaft having an upper shouldered face, a locking block having a lower shouldered locking face engaging the shouldered locking face of the drum, flexible connecting links one for each face of the polygonal drum between the locking block and the drum and a supporting bar or connection between the locking block and door having a pivotal connection with the locking block directly over the operating shaft so that the load on the door will not tend to turn the operating shaft in the release or opening direction, substantially as specified.

2. In a dump car, the combination with a load supporting door, of an operating shaft above the door, a polygonal winding drum on said shaft having a substantially horizontal upper shouldered face, a locking block having a lower shouldered locking face engaging the shouldered locking face of the drum, flexible connecting links one for each face of the polygonal drum between the locking block and the drum and a supporting bar or connection between the locking block and door having a pivotal connection with the locking block directly over the operating shaft so that the load on the door will not tend to turn the operating shaft in the release or opening direction, the locking faces of said drum and locking block being slightly inclined in the direction opposed to the opening of the door, substantially as specified.

3. In a dump car, the combination with a load supporting door, of an operating shaft above the door, a winding drum on said shaft having an upper shouldered face, a locking block having a lower shouldered locking face engaging the shouldered locking face of the drum, flexible connecting links between the locking block and the drum, and a supporting bar or connection between the locking block and door having a pivotal connection with the locking block directly over the operating shaft so that the load on the door will not tend to turn the operating shaft in the release or opening direction, said supporting bar having a bend therein to enable the same to clear the operating shaft, substantially as specified.

4. In a dump car, the combination with a load supporting door, of an operating shaft above the door, a polygonal drum thereon having a substantially horizontal upper flat side, a link connection corresponding in number of links to the faces of the drum and adapted to wind around the drum and having a flat sided terminal member fitting the flat upper side of the drum and a supporting connection between said terminal link member and the door, substantially as specified.

5. In a dump car, the combination with a load supporting door, of an operating shaft above the door, a drum thereon having an upper flat side, a link connection adapted to wind around the drum and having a flat sided terminal member fitting the flat upper side of the drum and a supporting connection between said terminal link member and the door, said supporting connection being pivotally connected to said terminal link member directly over the operating shaft, substantially as specified.

6. In a dump car, the combination with a load supporting door, of an operating shaft above the door, a drum thereon having an upper flat side, a link connection adapted to wind around the drum and having a flat sided terminal member fitting the flat upper side of the drum and a supporting connection between said terminal link member and the door, said supporting connection being pivotally connected to said terminal link member directly over the operating shaft, and said drum and terminal link member having interlocking shoulders to cause said terminal link member to move with the drum when the latter is turned in the door releasing or lowering direction, substantially as specified.

7. In a dump car, the combination with two hinged doors, of a bridge or connecting bar secured thereto, an operating shaft above the doors, a polygonal drum on said shaft having an upper substantially horizontal locking face, a locking block engaging the upper locking face of said drum, a link connection between said locking block and the drum, said link connection having one link for each face of the polygonal drum excepting the face thereof engaged by said locking block and a supporting connection between the locking block and the bridge or connecting bar of the doors, substantially as specified.

8. In a dump car, the combination with two hinged doors, of a bridge or connecting bar secured thereto, an operating shaft above the doors, a polygonal drum on said shaft having an upper substantially horizontal locking face, a locking block engaging the upper locking face of said drum, a link connection between said locking block and the drum, said link connection having one link for each face of the polygonal drum excepting the face thereof engaged by said locking block and a supporting connection between the locking block and the bridge or connecting bar of the doors, said locking block and drum having interengaging shouldered faces, substantially as specified.

9. In a dump car, the combination of two oppositely swinging hinged doors, an operating shaft above the doors, a polygonal drum on said shaft having an upper substantially horizontal locking face, a locking block having a lower locking face engaging the locking face of said drum, a link connection between said locking block and the drum, said link connection having one link for each face of the polygonal drum excepting the face thereof engaged by said locking block and a pair of supporting bars or links extending from said locking block, one to each of said doors, substantially as specified.

10. In a dump car, the combination with four doors, of bridge bars connecting the doors together in two sets of oppositely swinging pairs, an operating shaft above the doors, a polygonal drum on said shaft having an upper substantially horizontal locking face, a locking block having an under locking face engaging the upper locking face of the drum, a link connection between said locking block and the drum, said link connection having one link for each face of the polygonal drum excepting the face thereof engaged by said locking block and two supporting connections extending from the locking block, one to each bridge bar, substantially as specified.

11. In a dump car, the combination with four doors, of bridge bars connecting the doors together in two sets of oppositely swinging pairs, an operating shaft above the doors, a polygonal drum on said shaft having an upper substantially horizontal locking face, a locking block having an under locking face engaging the upper locking face of the drum, a link connection between said locking block and the drum, said link connection having one link for each face of the polygonal drum excepting the face thereof engaged by said locking block and two supporting connections extending from the locking block, one to each bridge bar, said supporting connections being pivotally connected to said locking block directly over the operating shaft, substantially as specified.

12. In a dump car, the combination with four doors, of bridge bars connecting the doors together in two sets of oppositely swinging pairs, an operating shaft above the doors, a polygonal drum on said shaft having an upper substantially horizontal locking face, a locking block having an under locking face engaging the upper locking face of the drum, a link connection between said locking block and the drum, said link connection having one link for each face of the polygonal drum excepting the face thereof engaged by said locking block, and two supporting connections extending from the locking block, one to each bridge bar, said supporting connections being pivotally connected to said locking block directly over the operating shaft, said locking block having an integral connecting lug at each end thereof, substantially as specified.

13. In a dump car, the combination with a load supporting door, of a supporting link pivotally connected to said door, an operating shaft, a polygonal drum on said shaft having an upper substantially horizontal locking face, a link connection corresponding in number of links to the faces of the drum and adapted to wind around the drum and having a terminal link pivotally connected directly over the operating shaft to said supporting link which is connected to the door, substantially as specified.

14. In a dump car, the combination with a load supporting door, of a supporting link connected to said door, an operating shaft, a polygonal drum on said shaft having an upper substantially horizontal locking face, a link connection corresponding in number of links to the faces of the drum and adapted to wind around the drum and having a terminal link pivotally connected directly over the operating shaft to said supporting link which is connected to the door, said terminal link and drum having interengaging shouldered faces, substantially as specified.

15. In a dump car, the combination with the center sills, of transversely swinging doors on each side of the center sills, a bridge bar connecting said doors, an operating shaft between the center sills, a polygonal drum on said shaft having an upper substantially horizontal locking face, a supporting link pivotally connected to said bridge bar and a link connection between said drum and said supporting link, said link connection having one link for each face of the polygonal drum, said supporting link being pivotally connected at its upper end to the terminal link of said link connection directly over the operating shaft, substantially as specified.

16. In a dump car, the combination with the center sills, of transversely swinging doors on each side of the center sills, a bridge bar connecting said doors, an operating shaft between the center sills, a polygonal drum on said shaft, a supporting link pivotally connected to said bridge bar and a link connection between said drum and said supporting link, said link connection having one link for each face of the polygonal drum, said supporting link being pivotally connected at its upper end to the terminal link of said link connection directly over the operating shaft, said terminal link and said drum having interengaging locking faces, substantially as specified.

17. In a dump car, the combination with the center sills, of a load supporting door below the center sills, an operating shaft between the center sills, a polygonal drum on said shaft having an upper substantially horizontal locking face, a supporting link having a pivotal connection with the door, a locking block having an under face fitting the uppermost face of said drum and a link connection between said locking block and the drum, said link connection having one link for each face of the polygonal drum excepting the face thereof engaged by said locking block, substantially as specified.

ARGYLE CAMPBELL.

Witnesses:
H. M. MUNDAY,
EDMUND ADCOCK.